B. P. SAUNDERS & O. WILLIAMS.
VARIABLE SPEED GEARING FOR THE REELS OF AGRICULTURAL MACHINERY.
APPLICATION FILED SEPT. 18, 1916.
1,241,446.
Patented Sept. 25, 1917.
3 SHEETS—SHEET 1.
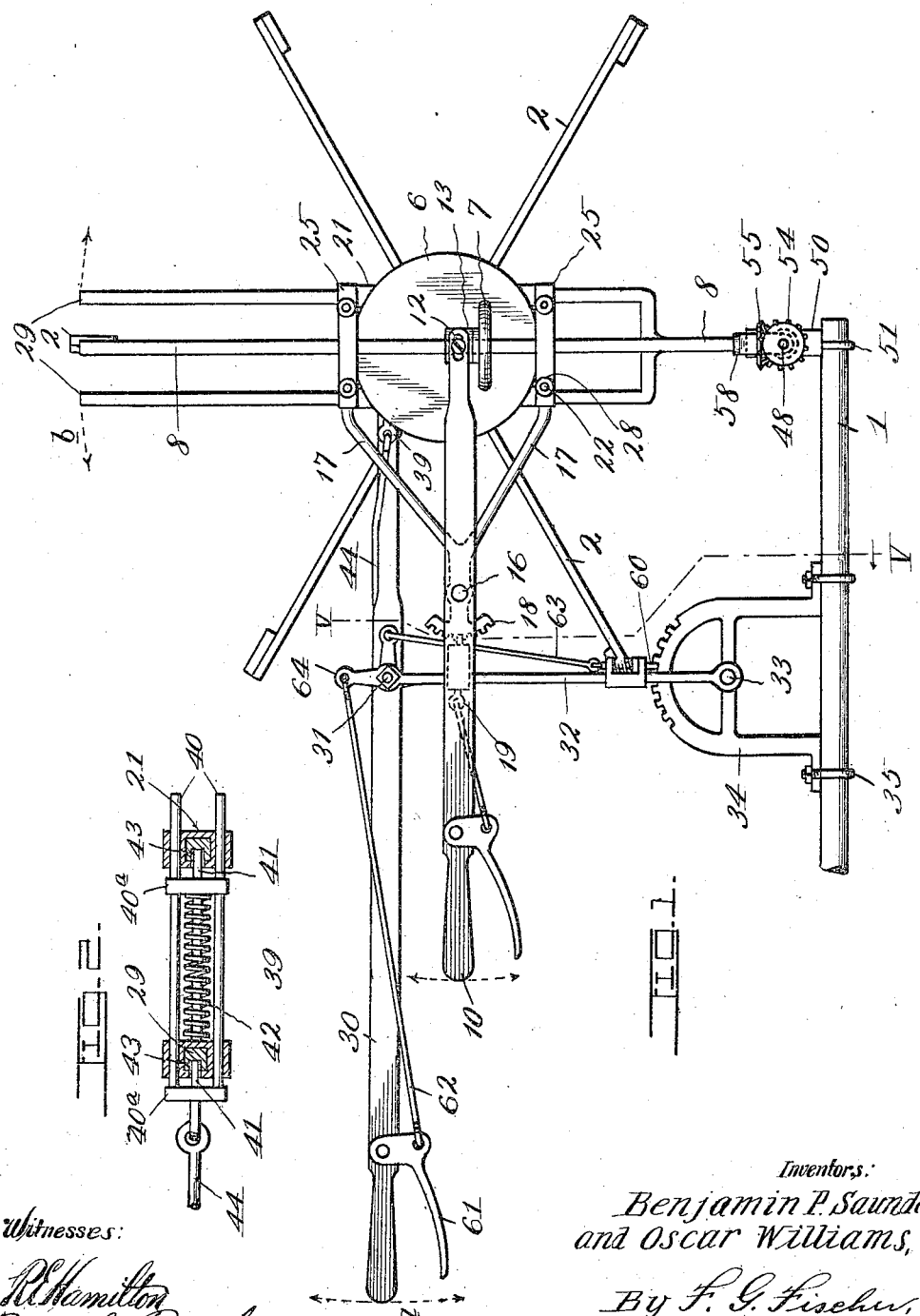
Witnesses:
R. Hamilton
Fred C. Fischer
Inventors:
Benjamin P. Saunders
and Oscar Williams,
By F. G. Fischer,
Atty.

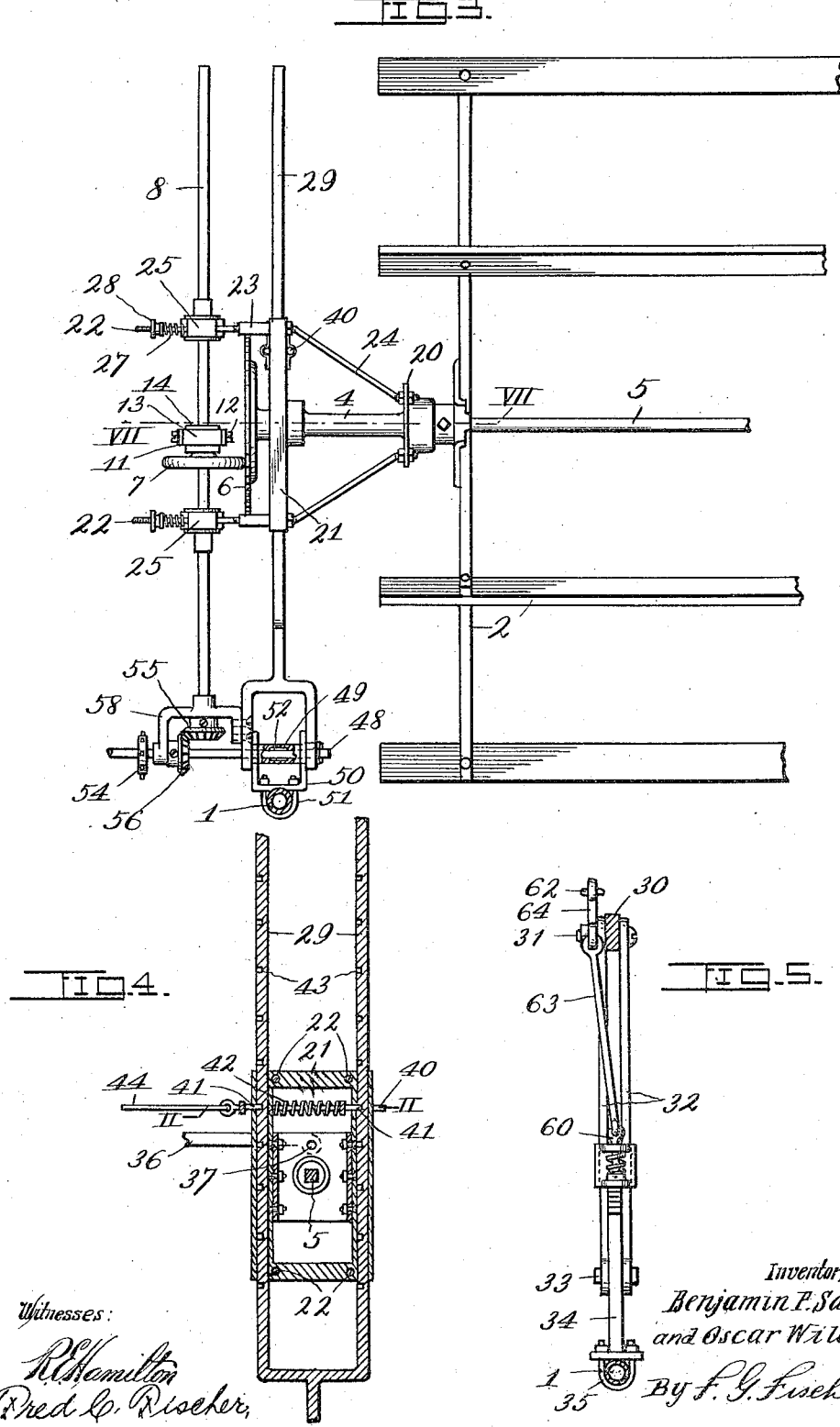

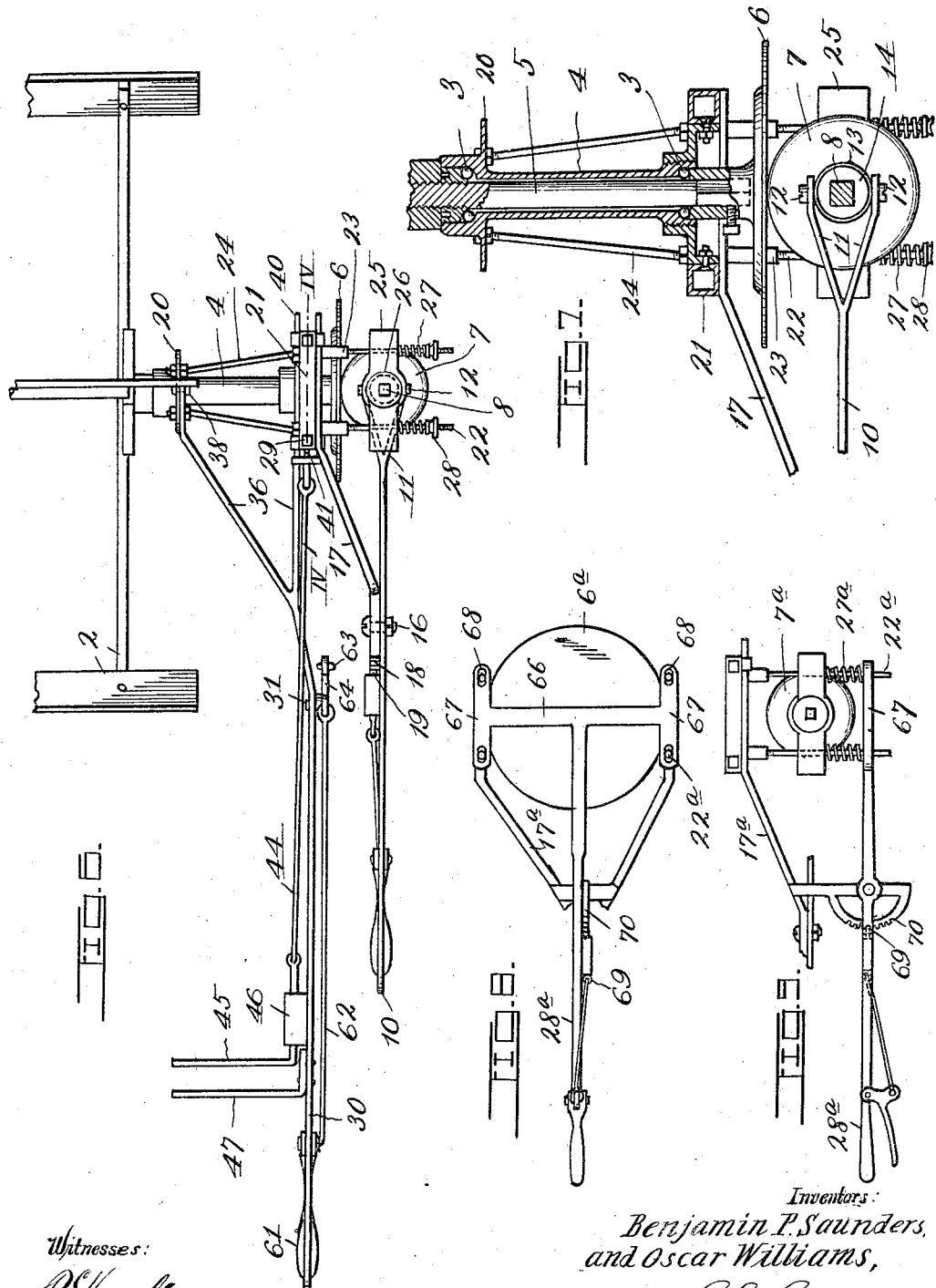

UNITED STATES PATENT OFFICE.

BENJAMIN P. SAUNDERS, OF IATAN, AND OSCAR WILLIAMS, OF WESTON, MISSOURI.

VARIABLE-SPEED GEARING FOR THE REELS OF AGRICULTURAL MACHINERY.

1,241,446.

Specification of Letters Patent. Patented Sept. 25, 1917.

Application filed September 18, 1916. Serial No. 120,661.

*To all whom it may concern:*

Be it known that we, BENJAMIN P. SAUNDERS and OSCAR WILLIAMS, citizens of the United States, residing at Iatan and Weston, in the county of Platte and State of Missouri, have invented certain new and useful Improvements in Variable-Speed Gearing for the Reels of Agricultural Machinery, of which the following is a specification.

Our invention relates to variable speed gearing for the reels of agricultural machinery and is an improvement over our U. S. Letters Patent No. 1,088,098 of Feb. 24, 1914.

The present invention embodies novel structural features whereby greater durability, efficiency and ease of operation may be had than heretofore.

In order that the invention may be fully understood, reference will now be made to the accompanying drawings, in which:

Figure 1 is a side elevation of our invention and that portion of a grain binder upon which it is mounted.

Fig. 2 is an enlarged cross section on line II—II of Fig. 4.

Fig. 3 is a front elevation of the parts disclosed by Fig. 1.

Fig. 4 is a vertical section on line IV—IV of Fig. 6.

Fig. 5 is an irregular vertical section on line V—V of Fig. 1.

Fig. 6 is a plan view of the parts disclosed by Fig. 1, with some of the lower parts removed.

Fig. 7 is an enlarged, horizontal section on line VII—VII of Fig. 3.

Fig. 8 is a side elevation of a modified form of means for regulating the pressure of a small friction wheel against a large friction wheel, employed in carrying out the invention.

Fig. 9 is a plan view of the parts disclosed by Fig. 8.

1 designates parts of the grain binder frame and 2 the grain binder reel which are of ordinary construction. Ball-bearings 3 are interposed between a stationary bearing 4 and the shaft 5 of the reel.

6 designates a large friction wheel mounted upon one end of the shaft 5 to drive the same. Said friction wheel 6 is driven by a small friction wheel 7, bearing against one side of the large friction wheel and slidably mounted upon a rectangular shaft 8, so that it may be adjusted radially toward and away from the center of the large friction wheel 6 to drive the same at different speeds.

Adjustment of the small friction wheel 7 longitudinally of the shaft 8, is effected by a lever 10 having a bifurcated end 11 connected by pivots 12 to diametrically opposite sides of a collar 13, loosely embracing the hub 14 of the small friction wheel 7. The lever 10 is fulcrumed upon a pivot 16 secured to a bracket 17, which has a notched segment 18 to receive a latch 19 mounted on the lever 10 to lock the same in any of its adjusted positions.

The bracket 17 is fixed at its bifurcated forward end to a slidable frame 21, from one side of which the bearing 4 projects, so that said bearing 4, together with the reel 2, will be carried up and down by said slidable frame 21.

22 designates two pairs of pins threaded into unions 23, threaded upon the adjacent ends of braces 24, extending through the upper and lower portions of the frame 21 and secured at their opposite ends to a circular flange 20, integral with the bearing 4. Each pair of pins 22 is provided with a transverse member 25, slidable thereon and provided with a centrally-disposed bushing 26 slidably mounted upon the shaft 8, but caused to rotate therewith. The transverse members 25 support the upper portion of the shaft 8 and are yieldingly-forced by coil springs 27 toward the large friction wheel 6, to hold the small friction wheel 7 firmly in frictional engagement therewith to rotate the same. The springs 27 are tensioned by screws 28 on the threaded ends of the pins 22, to regulate the pressure of the small friction wheel 7 against the large friction wheel 6.

The frame 21, which embodies a pair of parallel tubular portions slidable longitudinally on a bifurcated member 29, is adjusted up and down by a long lever 30, fulcrumed upon a pin 31 extending through a pair of links 32, mounted at their lower ends upon a pivot 33 projecting from a notched segment 34 secured by U-bolts 35 to a portion of the frame 1. The forward portion of the lever 30 is bifurcated as indicated at 36, Fig. 6, and one branch of said bifurcated portion is connected by a pivot 37 to the slidable frame 21, while the other branch is connected by a pivot 38 to the flange 20 on the outer end of the bearing 4 to aid in supporting said bearing.

The slidable frame 21 is locked at any point of its adjustment on the bifurcated member 29 by a latch 39 (Fig. 2), consisting of two parallel members 40 united by transverse members 40ª, carried by the members 40, two latch pins 41 and a coil spring 42. The parallel members 40 extend through the upper portion of the slidable frame 21 in which they are operably-mounted and are normally held in the position disclosed by Fig. 2, by the spring 42 in order to retain the latch pins 41 in notches 43 in the bifurcated member 29. The parallel members 40 are retracted against the action of the spring 42 to disengage the latch pins 41 from the notches 43, by a rod 44 connected at its forward end to said latch 39 and at its rear end to a handle 45 slidable in a support 46 fixed to one side of the lever 30, which is provided with a laterally projecting handle 47, adjacent said handle 45.

The bifurcated member 29 is pivotally-mounted at its lower end upon a shaft 48, journaled in a bearing 49 carried by a U-bracket 50 secured by U-bolts 51 to a portion of the frame 1. A lubricant chamber 52 is provided in the bearing 49 for holding a suitable lubricant for the shaft 48. Said shaft 48 is driven by a sprocket wheel 54, which in turn is driven from a suitable part of the binder.

Bevel gears 55 and 56 fixed to the shafts 8 and 48, respectively, serve to transmit motion from the latter to the former. As disclosed by Fig. 3, the lower end of the shaft 8 is journaled in a U-bearing 58, one end of which is fixed to the lower end of the bifurcated member 29, while its opposite end is rockable on the shaft 48.

The lever 30 is normally locked from backward or forward movement by a latch 60, adapted to engage the notched sector 34 and controlled by a handle 61, rods 62 and 63, and a bell-crank 64 fulcrumed on the pin 31.

The operation briefly stated is as follows: The reel is adjusted up or down according to the height of the grain, by rocking the lever 30 on the pivot 31, as indicated by the arrow $a$, Fig. 1. Likewise the reel 2 may be adjusted forward or backward, as indicated by the arrows $b$, Fig. 1, to suit the condition of the grain by moving the lever 30 backward or forward after the latch 60 has been disengaged from the sector 34. Any desired speed is imparted to the reel by adjusting the small friction wheel 7 closer to or farther from the center of the large friction wheel 6, through the intermediacy of the lever 10.

In the modified form disclosed by Figs. 8 and 9, quick acting means for regulating the pressure of the small friction wheel 7ª against the large friction wheel 6ª is provided in the form of a lever 28ª, which is substituted for the screws 28. As disclosed by Fig. 8, the forward end of said lever 28ª, is provided with a vertical member 66, having transverse terminals 67 with slots 68, through which the pins 22ª extend. The transverse terminals 67 bear against the springs 27ª and regulate the tension thereof according to the direction in which the lever 28ª, is adjusted. Said lever 28ª, is locked in any of its adjusted positions by a latch 69 engaging a notched sector 70, secured to the bracket 17ª.

Having thus described our invention, what we claim and desire to secure by Letters Patent, is:

1. In combination with a reel and a driven shaft, a friction wheel for driving said reel, a second friction wheel slidably mounted upon the driven shaft and engaging the first friction wheel to drive the same, means for adjusting the second friction wheel radially of the first friction wheel, a pair of transverse members located adjacent the upper and lower portions of the first friction wheel and in which the driven shaft is mounted, pins upon which said transverse members are slidably mounted, unions into which said pins are threaded, suitable supports for said unions, coil springs embracing said pins and bearing against the transverse members to regulate the pressure of the second friction wheel against the first friction wheel, and means operably-engaging the pins and pressing against said springs to tension the same.

2. In combination with a reel shaft and a driven shaft, a bearing provided near one end with a peripheral flange and in which the reel shaft is journaled, a frame from which said bearing projects, a suitable support for said frame, brace members secured to the flange on the bearing at one end and secured to the frame at their opposite end, unions threaded on the last-mentioned ends of said brace members and bearing against the frame, pins threaded into said unions, transverse members through which said pins loosely extend and in which the driven shaft is mounted, coil springs embracing said pins and bearing against the transverse members, a friction wheel mounted on the reel shaft to drive the same, a friction wheel mounted on the driven shaft and engaging the first friction wheel to drive the same, means for adjusting the second friction wheel radially of the first friction wheel, and means operably-engaging the pins and bearing against the coil springs to tension the same and regulate the pressure of the second friction wheel against the first friction wheel.

3. In combination with a shaft, a reel mounted on said shaft and a rockable driven shaft, means for driving said reel at variable speeds, a bearing in which the reel shaft is journaled, a rectangular frame carrying said bearing and provided with two tubular portions, a rockable bifurcated member extending through the tubular portions and on which said frame is slidably mounted, a latch mounted on the frame to engage said rockable bifurcated member and secure the frame at any point of its adjustment, a lever having a forked end pivotally-connected to the reel shaft bearing and to the frame to slide the same on the bifurcated member and also to rock said bifurcated member and the driven shaft, means mounted on said lever for actuating the latch, a pair of links between the upper ends of which said lever is fulcrumed, a notched sector to which the lower ends of said links are pivotally-connected to rock with the bifurcated member and the driven shaft, and a latch mounted on said lever and adapted to engage the notched sector to secure the links at any point of their pivotal adjustment.

In testimony whereof we affix our signatures in the presence of two witnesses.

BENJAMIN P. SAUNDERS.
OSCAR WILLIAMS.

Witnesses:
F. G. FISCHER,
L. J. FISCHER.

Copies of this patent may be obtained for five cents each, by addressing the "Commissioner of Patents, Washington, D. C."